United States Patent
Kim

(10) Patent No.: US 6,526,132 B2
(45) Date of Patent: Feb. 25, 2003

(54) BI-DIRECTIONAL CID SERVICE PROVIDING APPARATUS AND METHOD

(75) Inventor: Jong Ho Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/017,587

(22) Filed: Dec. 18, 2001

(65) Prior Publication Data

US 2002/0076023 A1 Jun. 20, 2002

(30) Foreign Application Priority Data

Dec. 19, 2000 (KR) ........................... 2000-78177

(51) Int. Cl.[7] ..................... H04M 15/06; H04M 11/00
(52) U.S. Cl. ................... 379/142.04; 379/142.06; 379/142.01; 379/157; 379/88.21; 379/93.23
(58) Field of Search ............... 379/142.01, 142.04, 379/142.05, 142.06, 142.08, 142.15, 142.17, 67.1, 88.07, 88.09, 88.1, 88.11, 88.12, 88.2, 88.21, 88.22, 88.23, 156, 157, 158, 93.23, 93.17

(56) References Cited

U.S. PATENT DOCUMENTS

| | | | | |
|---|---|---|---|---|
| 5,289,530 A | * | 2/1994 | Reese | 379/142 |
| 5,524,140 A | * | 6/1996 | Klausner et al. | 379/142 |
| 5,631,949 A | * | 5/1997 | Milton et al. | 379/67.1 |
| 5,724,412 A | * | 3/1998 | Srinivasan | 379/93.23 |
| 5,859,903 A | * | 1/1999 | Lee | 379/142 |
| 5,875,240 A | * | 2/1999 | Silverman | 379/142 |
| 6,282,275 B1 | * | 8/2001 | Gurbani et al. | 379/142 |
| 6,292,549 B1 | * | 9/2001 | Lung et al. | 379/142.01 |
| 6,359,978 B1 | * | 3/2002 | Brady | 379/142.06 |
| 6,404,868 B1 | * | 6/2002 | Beamish et al. | 379/142.01 |
| 6,442,264 B1 | * | 8/2002 | Sutter | 379/142.07 |
| 6,449,345 B1 | * | 9/2002 | Grimes | 379/88.23 |

* cited by examiner

Primary Examiner—Rexford Barnie
(74) Attorney, Agent, or Firm—Fleshner & Kim, LLP

(57) ABSTRACT

A bi-directional Calling Identity Delivery (CID) system is disclosed, including a first CID unit of a destination phone set that receives, displays, and stores first CID data of a call and displays, stores, and transmits second CID data of a prior call. A call-originating terminal receives the corresponding second CID data in response to a CID data request signal. A second CID unit of a destination exchange transmits a CID data transmission control signal to the first CID unit, receives the corresponding second CID data from the first CID unit, and transmits the corresponding second CID data to the call-originating terminal. The first CID unit transmits the corresponding second CID data to the second CID unit in response to receiving the CID data transmission control signal, and the second CID unit transmits the CID data transmission control signal in response to receiving the CID data request signal initiated by the call-originating terminal.

27 Claims, 3 Drawing Sheets

BI-DIRECTIONAL CID SERVICE PROVIDING APPARATUS AND METHOD

BACKGROUND OF THE INVENTION

1. Field of the Invention

The present invention relates to an additive service of a public phone communication system and, more particularly, to an apparatus and method for providing a bi-directional Calling Identity Delivery (CID) service.

2. Background of the Related Art

A CID service is intended to display a phone number and a name of a caller, before initiating a call communication or during a call communication, on a display terminal unit of a destination service subscriber. The CID service does this by utilizing an automatic number identification function of a phone network, which function is used for a special purpose such as billing for another provider's relay call.

In addition to providing a data service to an analog subscriber, the CID service field anticipates a considerable technological and industrial effect for a terminal related to computer telephony integration (CTI), which has been recently activated.

FIG. 1 is a schematic block diagram of a CID service unit in accordance with a background art. The background CID service system includes a CID unit 100 of a destination phone set that displays caller information of a destination call. A CID data processing unit 210 generates caller information (termed 'CID data,' hereinafter), such as a caller phone number, a caller name, and a call date/time, and transmits the CID data to the destination telephone set.

The CID unit 100 of the destination phone set includes a CID modem 130 that receives CID data from the CID data processing unit 210; an LCD panel 110 that displays the CID data received through the CID modem 130; a controller 140 that controls various signals, data transmission, and a display operation of the CID data; and a call circuit unit 120 that controls a call set-up related to the caller, according to a call control signal of the controller 140. The CID unit 100 may be inserted in the destination phone set or may be installed separately from the destination phone set. The service operation of the CID system of the background art will now be described in detail.

When the caller dials a subscriber number to be called, a pertinent intra-office exchange 300 generates a 'call connection request signal' and transmits it through a transmission line to the CID data processing unit 210 of a pertinent called party exchange. While receiving the 'call connection request signal,' the CID data processing unit 210 searches a CID service data base DB) (not shown) to check whether the corresponding caller has been registered in the CID service DB. If the caller has been registered in the CID service DB, the CID data processing unit 210 generates CID data, such as a caller number, a name, or a calling date/time, and transmits the CID data when a ring signal is transmitted to the call circuit unit 120 of the destination phone set (between a first ring signal and a second ring signal). The transmitted CID data is transmitted to the CID modem 130.

The CID modem 130 performs a frequency-shift keying (FSK) demodulation and a predetermined signal-conversion for the received CID data and displays the CID data on the LCD panel 110. Then, the subscriber can be aware of the caller, by checking the content displayed on the LCD panel 110.

Data transmission between the CID unit 100 of the destination phone set and the destination exchange 200 is made using the FSK method. The FSK method allows transmission of character data as well as the number and a data transmission in an ON-hook state and an OFF-hook state, so that it is suitable to provide the CID service.

If a new call set-up is requested when the destination phone set is in the OFF-hook state, the CID data processing unit 210 of the destination exchange 200 transmits a specific tone signal to the destination phone set through a speech path of the previously established call. Then, the CID modem 130 recognizes the specific tone signal, according to a control signal of the controller 140, and transmits a response signal to the CID data processing unit 210. The CID data processing unit 210 transmits CID data of the call, which has requested a set-up, to the CID modem 130. Then, the destination phone set performs an FSK demodulation and a signal conversion for the CID data and displays it on the LCD panel 110. In this manner, the subscriber can identify the caller through the LCD panel 110, even for a subsequently received phone call which is made while the subscriber is on a prior call communication, so that the subscriber can take a proper step for the other call.

As stated above, the transmission form of the background CID service system is a unidirectional transmission from the CID data processing unit 210 to the CID modem 130 of the subscriber. Thus, it is limited in utilizing the CID more positively.

In addition, since the CID data is stored in the memory of the destination phone set, there is no way for the subscriber to check the CID data without the destination phone set.

This kind of spatial restriction for information and the low equipment use efficiency of the uni-directional transmission have been noticed as the major shortcomings of the CID service system.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a bi-directional CID service apparatus and method that enable an external communication unit to read CID data stored in a destination phone set.

To achieve at least the above objects in whole or in part, there is provided a bi-directional CID service providing apparatus including: a CID unit of a destination phone set having functions of displaying, storing, transmitting, and receiving CID data of a destined call; a call-originating terminal unit that transmits a CID data request signal to the CID unit of the destination phone set and receives corresponding CID data; and a CID unit of a destination exchange that transmits a 'CID data transmission control signal' to the destination phone set, receives the corresponding CID data, and transmits the CID data to the call-originating terminal unit.

To achieve at least these advantages in whole or in part, there is further provided a bi-directional CID service providing method including checking whether a 'CID data request signal' has been received, while receiving a call set-up request signal from a call-originating terminal unit; searching a CID service DB to check whether a destination phone number is a registered one, if the 'CID data request signal' has been received upon checking; transmitting a 'CID data transmission control signal' requesting transmission of CID data from the destination phone set, if the destination phone number has been registered in the DB according to the DB searching result; and transmitting the CID data to the call-originating terminal unit, when the CID data is transmitted from the destination phone set.

The objects of the invention may be achieved in whole or in part by a bi-directional Calling Identity Delivery (CID) device, including a CID communication unit that converts received modulated signals to received baseband signals and converts transmit baseband signals to transmit modulated signals; a CID controller that determines whether a call is a general call or a bi-directional CID service call, based on the received baseband signals; a memory that stores a CID database; and a CID service manager that generates CID information, if a destination terminal identified in the received baseband signals is registered in the CID database, under the control of the CID controller. The CID communication unit converts the CID information to the transmit modulated signals for external transmission.

The objects of the invention may be further achieved in whole or in part by a bi-directional Calling Identity Delivery (CID) method, including determining whether a call is a general call or a bi-directional CID call, based on a received call setup signal; transmitting originating party CID information to a destination terminal if the destination terminal identified in the call set-up signal is registered in a CID database; and transmitting answering party CID information received from the destination terminal to an originating terminal of the bi-directional CID call.

The objects of the invention may be further achieved in whole or in part by a method of retrieving call information, including storing telephone call connection information at a first subscriber unit and retrieving the call connection information from the first subscriber unit through a telephone call using a second subscriber unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A bi-directional CID service of the present invention has a function of forwarding CID data, stored by a CID unit of a destination phone set, to a phone set, a computer, or a mobile communication terminal of a caller. That is, unlike the existing unidirectional CID service which allows only the destination phone set to check the CID data, the present invention enables a subscriber to check CID data destined and stored in his or her own phone set, using various communication units, even when the subscriber goes beyond a subscription area.

Figure 1:
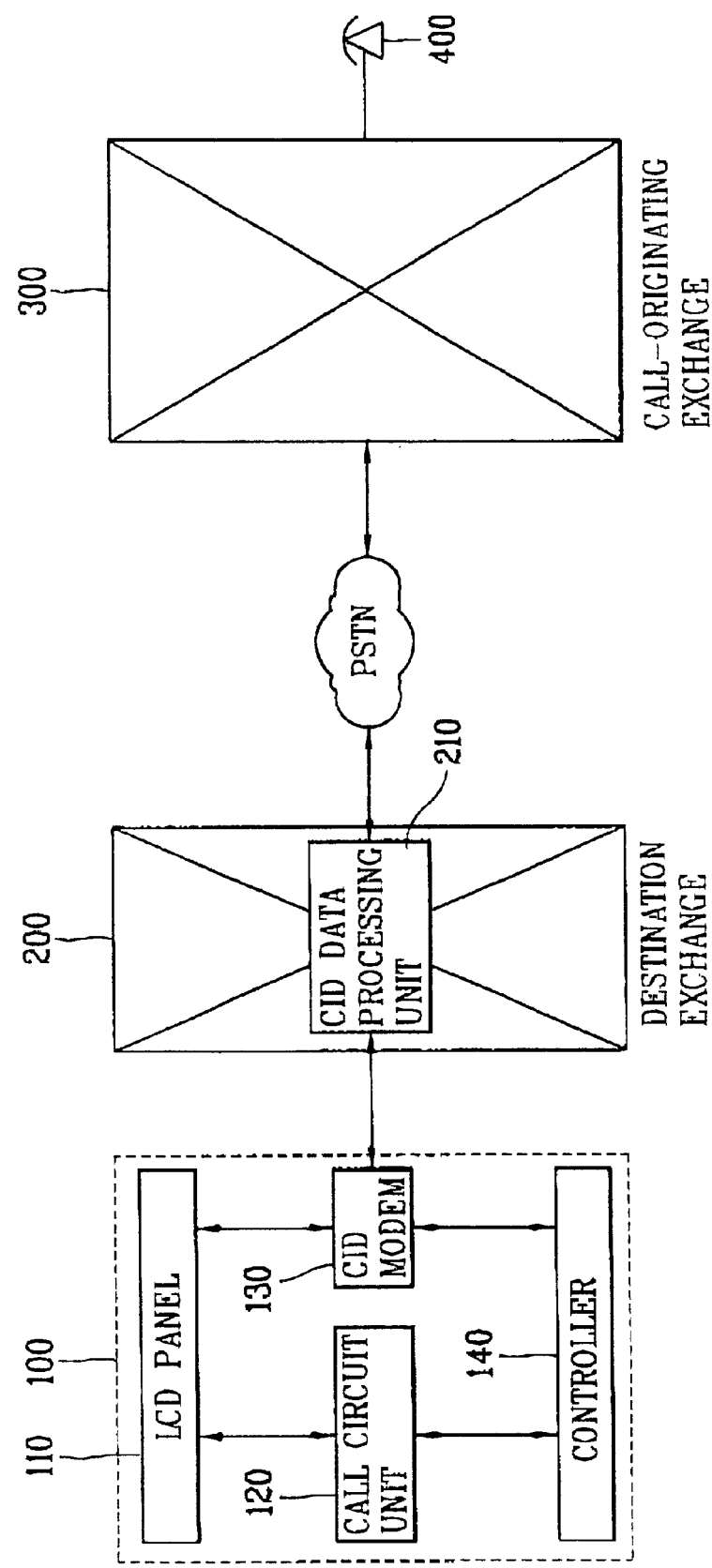
FIG. 1 illustrates a unidirectional CID service providing apparatus in accordance with a background art.
Figure 2:
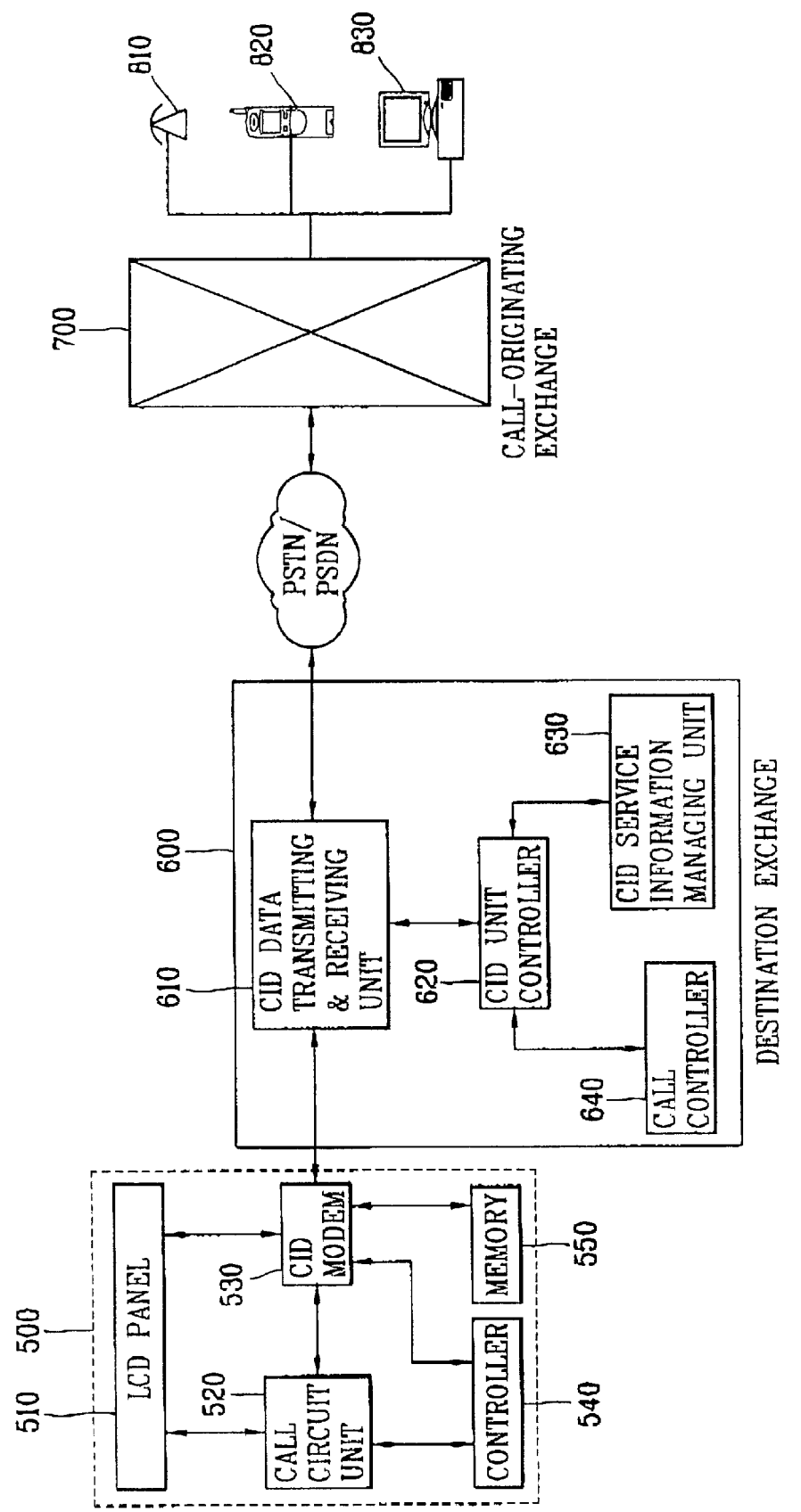
FIG. 2 illustrates a bi-directional CID service providing apparatus in accordance with a preferred embodiment of the present invention.

FIG. 2 is a schematic block diagram of a bi-directional CID service providing apparatus in accordance with a preferred embodiment of the present invention. The bi-directional CID service system of the present invention includes a CID unit 500 of a destination phone set having functions of displaying, storing, transmitting, and receiving CID data of a destined call; call-originating terminal units 810, 820, and 830 for transmitting a CID data request signal to the CID unit 500 of the destination phone set and receiving corresponding CID data; a CID unit 600 of a destination exchange for transmitting a 'CID data transmission control signal' to the destination phone set, receiving corresponding CID data, and transmitting the CID data to the call-originating terminal unit.

The CID unit 600 of the destination exchange includes: a CID data transmitting and receiving unit 610 for transmitting a CID data transmission control signal to the destination phone set and receiving corresponding CID data; a CID unit controller 620 for controlling the CID data, transmitted through the CID data transmitting and receiving unit 610, and a transmission and reception state of a control signal; a call controller 640 for controlling a switch connection between the CID data transmitting and receiving unit and an external unit and controlling a signal related to a CID service call under the control of the CID unit controller 620; and a CID service information managing unit 630 for searching a CID service DB (not shown) and generating corresponding CID data under the control of the CID unit controller 620.

The CID unit 500 of the destination phone set includes: a CID modem 530 for transmitting and receiving CID data to and from the CID data transmitting unit 610; an LCD panel 510 for displaying the CID data received through the CID modem 530; a controller 540 for controlling various signals, controlling data transmission and reception, and controlling a display operation of the CID data; a memory 550; and a call circuit unit 520 for controlling a call set-up with a caller according to a call control signal of the controller 540.

Figure 3:
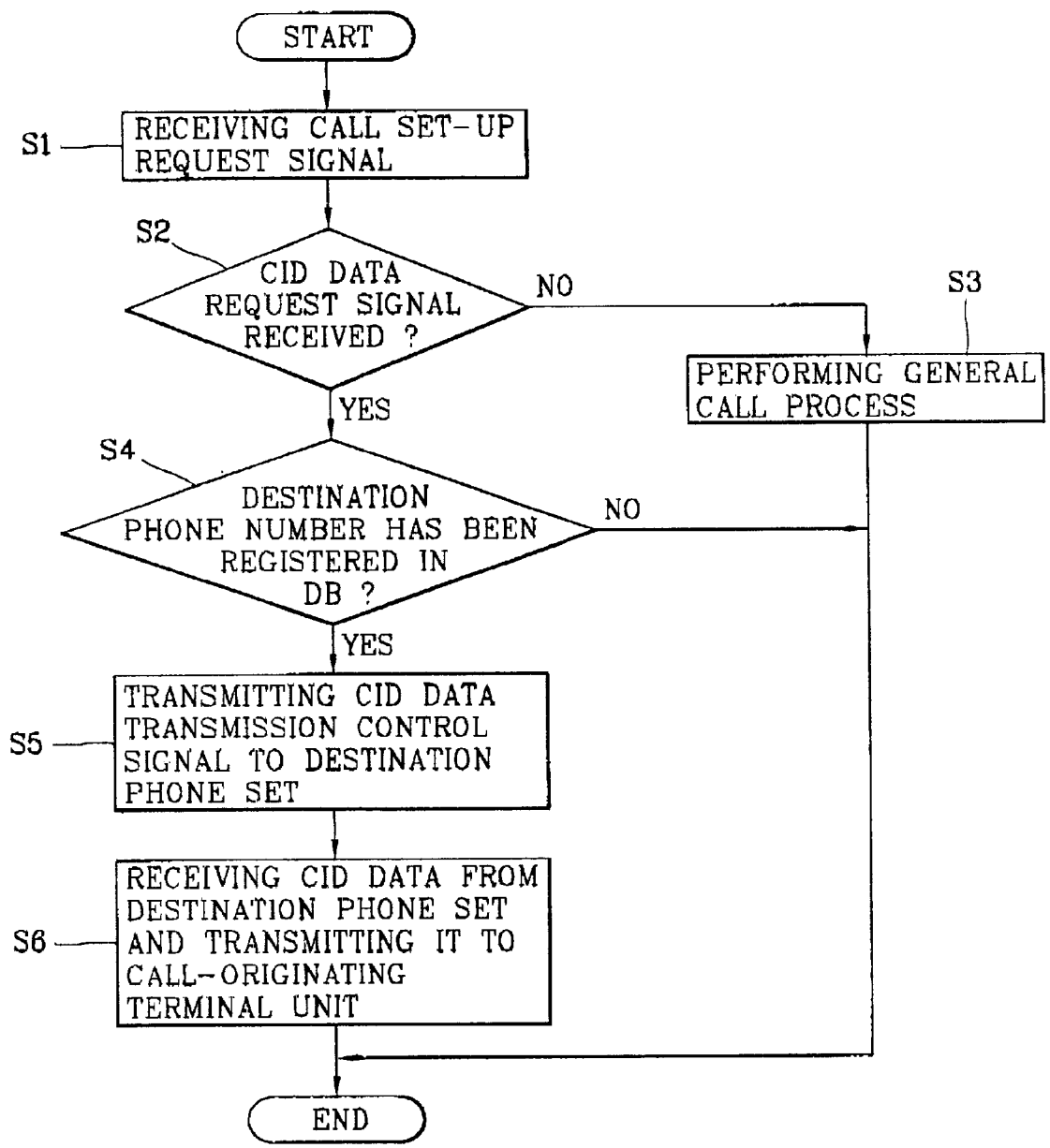
FIG. 3 illustrates a flow chart of a bi-directional CID service providing method in accordance with the preferred embodiment of the present invention.

FIG. 3 is a flow chart of a bi-directional CID service providing method in accordance with the preferred embodiment of the present invention. A control method of the bi-directional CID system of the present invention includes checking whether a 'CID data request signal' has been received (step S2), while receiving a call set-up request signal from a call-originating terminal unit (step S1); searching a CID service DB to determine whether a destination phone number is a registered one (step S4), if the 'CID data request signal' has been received; transmitting a 'CID data transmission control signal,' requesting transmission of CID data, to the destination phone set (step S5), if the destination phone number has been registered in the DB; and transmitting the CID data to the call-originating terminal unit (step S6), when the CID data is transmitted from the destination phone set.

An example of a subscriber retrieving CID data stored in his or her telephone using a communication device located outside his or her usual subscriber area will now be described. To set up a bi-directional CID service call, a subscriber may preferably approach a telephone network in a different way from that used for a general call. That is, the subscriber may attempt a call set-up to the intra-office exchange 700 by adding an additive code (a specific code such as # or *, etc.) or number to his or her own subscriber number and dialing it or by connecting to a supplementary service of a telephone network (i.e., 700-xxxx) and depressing his or her own subscriber number. Then, the exchange 700 of the corresponding call-originating place generates a 'call connection request signal' and a 'CID data request signal' and transmits them to the destination exchange 600.

As the destination exchange 600 receives the call connection request signal (step S1), the CID unit controller 620 checks whether the CID data request signal has been received by the CID data transmitting and receiving unit 610 (step S2). As mentioned above, the reason why the CID unit controller 620 checks whether the CID data request signal has been received is to determine whether the received call connection request signal is for a general call, of a simple call purpose, or for a bi-directional CID service call.

In step S2, if no CID data request signal is received, the CID data controller 620 regards the call connection request signal as one for a general call and performs a general call processing procedure (step S3). The general call processing procedure (step S3) provides the background 'uni-directional CID service,' in which CID data such as a caller number, a caller name, a call date/time is transmitted to the CID unit 500 of the destination phone set.

The CID unit controller 620 instructs the CID service information managing unit 630 to search the CID service DB, to check whether a corresponding caller has been registered in the CID service DB (step S4). If the caller has been registered in the CID service DB, the CID service information managing unit 630 generates CID data, such as a caller number, a caller name, and a call date/time, and transmits the CID data to the CID modem (530) when the ring signal is transmitted to the call circuit unit 520 of the destination phone set (that is, between the first ring signal and the second ring signal).

Under the control of the controller 540, the CID modem 530 performs an FSK demodulation and a signal conversion for the received CID data, displays the CID data on the LCD panel 510, and stores the CID data in the memory, so that the subscriber can output the stored CID data on the LCD window at any time, as desired.

In the course of performing step S3, if the destination phone set 500 is in an off-hook state, the CID data transmitting and receiving unit 610 transmits a specific tone signal to the destination phone set 500 through a speech path of the previously established call and waits for a response signal. When the CID data transmitting and receiving unit 610 receives the response signal from the destination phone set 500, it transmits the corresponding CID data. In the same manner as in the background art, the CID modem 530 of the destination phone set 500 is under the control of the controller 540, performs the FSK demodulation and a signal conversion for the CID data, and displays it on the LCD panel 510. Thus, the subscriber can check information of the caller as displayed on the LCD panel 510, even while he or she is talking on the phone, and take a suitable step. The received CID data is stored in the memory 550 under the control of controller 540.

In step S2, if the CID data request signal is transmitted from the caller, the CID unit controller 620 initiates a bi-directional CID service. After identifying that the CID data request signal has been received, the CID unit controller 620 instructs the CID service information managing unit 630 to search the CID service DB, to check whether the destination subscriber number dialed by the caller has been registered in the CID service DB (step S4). If the destination subscriber number is registered in the CID service DB, the CID unit controller 620 transmits a signal of a specific tone, which is different to a tone used for the background uni-directional CID service, to the CID modem 530 of the destination phone set (step S5). The specific tone signal is the CID data transmission control signal. Under the control of controller 540, the CID modem 530 reads the CID data stored in the memory 550 and transmits it to the CID data transmitting and receiving unit 610. Then, the CID data transmitting and receiving unit 610 transmits the CID data to the corresponding caller 810, 820, or 830 through the call-originating exchange 700 (step S6).

In step S4, if the phone number of the called party has not been registered in the CID service DB, the CID unit controller 620 terminates the bi-directional CID service and releases the CID service call.

With the bi-directional CID service providing method, the subscriber can access the CID unit of his or her own phone set and check the stored CID data using a remotely located communication device. There are various terminals the subscriber can use to access the bi-directional CID service. Any terminal that interworks with a PSTN network, such as a mobile communication terminal, a computer, a general phone set, and a CID unit built-in phone set, can be used as the call-originating terminal unit.

In the aspect that the mobile communication terminal or the computer connected to the Internet is a general unit, which can transmit or display character or number data, it has no problem receiving the bi-directional CID service. In addition, the general phone set also can convert the CID data, that is, the character data, into voice information to receive the bi-directional CID service. Thus, the service providing domain can be widened.

As so far described, the bi-directional CID service providing apparatus and method has many advantages.

For example, since the CID service can be bi-directionally provided, unlike in the background art where the CID service is uni-directionally provided, the use efficiency of the CID unit and the transmission line are improved.

Since the use efficiency is increased without changing the existing equipment, the expense is relatively reduced.

Also, since the bi-directional CID service is provided using various forms of terminals connected to a PSDN, a PSTN, or mobile communication network, the present invention presents the possibility for the development of a new supplementary service.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A bi-directional Calling Identity Delivery (CID) system, comprising:
   a first CID unit of a destination phone set that receives, displays, and stores first CID data of a call, and displays, stores, and transmits second CID data of a prior call;
   a call-originating terminal that receives the corresponding second CID data in response to a CID data request signal; and a second CID unit of a destination exchange that transmits a CID data transmission control signal to the first CID unit, receives the corresponding second CID data from the first CID unit, and transmits the corresponding second CID data to the call-originating terminal, wherein the first CID unit transmits the corresponding second CID data to the second CID unit in response to receiving the CID data transmission control signal, and the second CID unit transmits the CID data transmission control signal in response to receiving the CID data request signal initiated by the call-originating terminal, the second CID unit including a CID service information managing unit that searches CID service data and generates the second corresponding CID data.

2. The system of claim 1, wherein the second CID unit comprises:

a CID data transmitting and receiving unit that transmits the CID data transmission control signal to the destination phone set and receives the corresponding second CID data;

a CID unit controller that controls a transmission and reception state of CID data transmitted through the CID data transmitting and receiving unit and controls a control signal; and a call controller that controls a switch connection between the CID data transmitting and receiving unit and an external unit and controls a signal related to a CID service call under control of the CID unit controller, wherein the CID service information managing unit searches a CID service database (DB) and generates the first CID data under control of the CID unit controller.

3. The system of claim 1, wherein the first CID unit comprises a CID modem that provides signal transmission and reception.

4. The system of claim 1, wherein the call-originating terminal is a mobile communication system, an information processing terminal connected to a PSDN network, a CID unit built-in phone set, or a general phone set.

5. The system of claim 1, wherein the second CID unit provides a bi-directional CID service even when the destination phone set is in an off-hook state.

6. The system of claim 1, wherein the second CID unit transmits and receives data to and from the first CID unit using a frequency-shift keying (ASK) method.

7. The system of claim 1, wherein the CID data transmission control signal is transmitted along with a ring signal.

8. The system of claim 2, wherein the CID data transmission control signal is a specific tone.

9. The system of claim 2, wherein the CID service information managing unit determines whether a destination phone number is registered in the CID service DB.

10. A bi-directional Calling Identity Delivery (CID) service method, comprising:

determining whether a CID data request signal has been received, while receiving a call set-up request signal from a call-originating terminal;

determining whether a destination phone number is registered in a CID service database DB);

transmitting a CID data transmission control signal, and requesting transmission of CID data from a destination phone set if the destination phone number is registered in the CID service DB; and transmitting the CID data to the call-originating terminal.

11. The method of claim 10, further comprising performing a general call processing procedure if no CID data request signal is received.

12. The method of claim 10, further comprising terminating the bi-directional CID service, if the destination phone number is not registered in the CID service DB.

13. The method of claim 10, wherein the CID data transmission control signal is transmitted when a ring signal is transmitted.

14. The method of claim 10, wherein the CID data transmission control signal is a specific tone.

15. The method of claim 10, wherein the call-originating terminal is a mobile communication system, an information processing terminal connected to a PSDN network, a CID unit built-in phone set, or a general phone set.

16. The method of claim 10, wherein a CID unit of the destination phone set transmits and receives a signal and data even while the destination phone set is in an off-hook state.

17. The method of claim 10, wherein a CID unit of the destination phone set and a CID unit of an exchange communicate data to each other using a frequency-shift keying (FSK) method.

18. A bi-directional Calling Identity Delivery (CID) method, comprising:

determining whether a call is a general call or a bi-directional CID call;

transmitting originating party CID information to a destination terminal if the destination terminal identified in a call set-up signal is registered in a CID database; and transmitting stored CID information received from the destination terminal to an originating terminal of the bi-directional CID call.

19. The method of claim 18, wherein the call is determined to be the bi-directional CID call if a CID data request signal is received with the call set-up signal.

20. The method of claim 18, wherein the bi-directional CID call is terminated if the destination terminal is not registered in the CID database.

21. The method of claim 18, further comprising transmitting the stored CID information, stored in a memory of the destination terminal, from the destination terminal to a destination exchange if the call is determined to be the bi-directional CID call.

22. The method of claim 18, further comprising transmitting a unique tone to the destination terminal through a speech path of an established call, to which the destination terminal is connected, to inform the destination terminal of the bi-directional CID call, if the destination terminal is in an off-hook state.

23. A bi-directional Calling Identity Delivery (CID) device, comprising:

a CID type determining means for determining whether a call is a general call or a bi-directional CID call;

a CID generating means for generating and transmitting originating party CID information to a destination terminal if the destination terminal identified in a call set-up signal is registered in a CID database; and a CID forwarding means for transmitting stored CID information received from the destination terminal to an originating terminal of the bi-directional CID call.

24. The device of claim 23, wherein the call is determined to be the bi-directional CID call if a CID data request signal is received with the call set-up signal.

25. The device of claim 23, wherein the bi-directional CID call is terminated if the destination terminal is not registered in the CID database.

26. The system of claim 1, wherein the CID service information managing unit searches a database for information corresponding to the destination phone and generates the second corresponding CID data based on results of the database search.

27. The system of claim 30, wherein said information corresponding to the destination phone includes information indicating that a number corresponding to the destination phone has been registered.

* * * * *